United States Patent [19]
Davis

[11] Patent Number: 6,065,431
[45] Date of Patent: May 23, 2000

[54] PORTABLE, LOW-PROFILE SCRUBBER DEVICE

[76] Inventor: William P. Davis, 215 E. Thorndale Ave., Roselle, Ill. 60172

[21] Appl. No.: 09/217,533

[22] Filed: Dec. 21, 1998

[51] Int. Cl.$^7$ ................................................ A01K 13/00
[52] U.S. Cl. ............................................................. 119/600
[58] Field of Search .................................. 119/600, 601, 119/608, 609, 612, 615, 663, 664; 15/21.1, 104.92, 160, 76, 75, 74, 73

[56] References Cited

U.S. PATENT DOCUMENTS

| | | | |
|---|---|---|---|
| 2,104,272 | 1/1938 | Partridge | 15/76 |
| 2,221,442 | 11/1940 | Cunningham . | |
| 2,253,539 | 8/1941 | Steinhilber . | |
| 2,255,080 | 9/1941 | Nielsen . | |
| 2,255,081 | 9/1941 | Nielsen et al. . | |
| 2,268,721 | 1/1942 | Ossowsky . | |
| 3,781,939 | 1/1974 | Qualheim | 15/38 |
| 3,866,265 | 2/1975 | Beazley | 15/75 |
| 4,009,499 | 3/1977 | Casler et al. | 15/21 D |
| 4,147,815 | 4/1979 | Andrich et al. | 427/64 |
| 4,554,696 | 11/1985 | Nye, Jr. | 15/21 D |
| 4,951,339 | 8/1990 | Braun | 15/88.3 |
| 5,224,233 | 7/1993 | Rich | 15/88.3 |

*Primary Examiner*—Thomas Price
*Attorney, Agent, or Firm*—James P. Murphy

[57] ABSTRACT

The present invention provides a portable, low-profile scrubber device which is battery powered and provides enough torque to scrub an animal's paws. The present invention includes a lower housing holding a battery, motor and gear system, with a drive shaft extending from the housing. A second housing is secured to the lower housing and holds water and cleaner. A rotatable brush or brushes are situated in the second housing operably connected to the drive shaft from the first housing. The brush(es) are at least partially submersible in the water of the second housing. The housings are thus operably connected in a liquid-tight fashion and are low profile so that the paws of a dog, cat or other animal can be easily cleaned by the brush(es) in the water of the second housing.

17 Claims, 2 Drawing Sheets

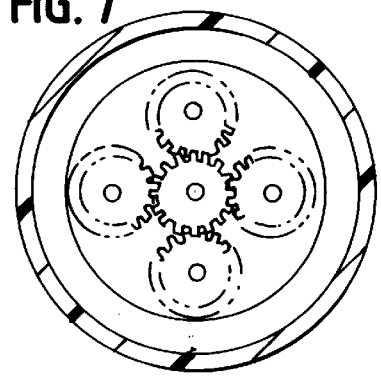
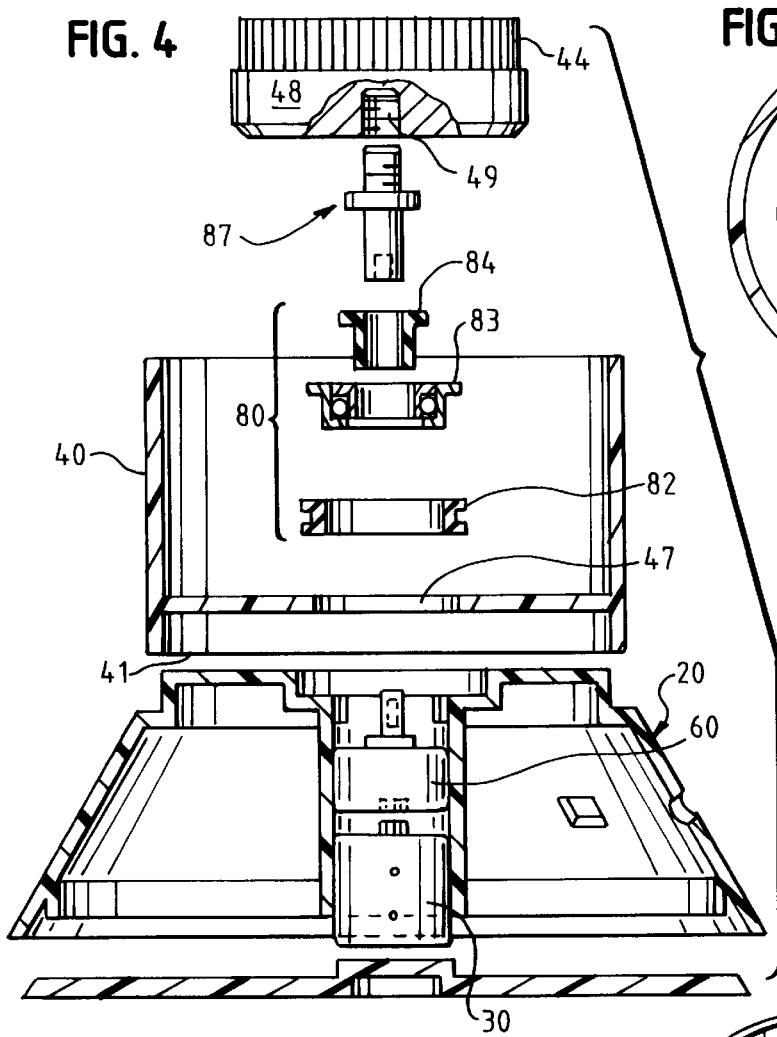
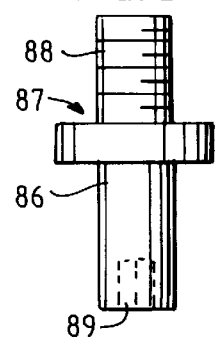
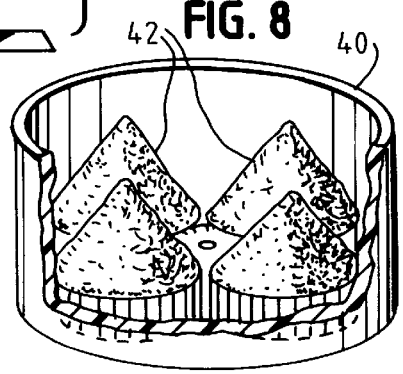
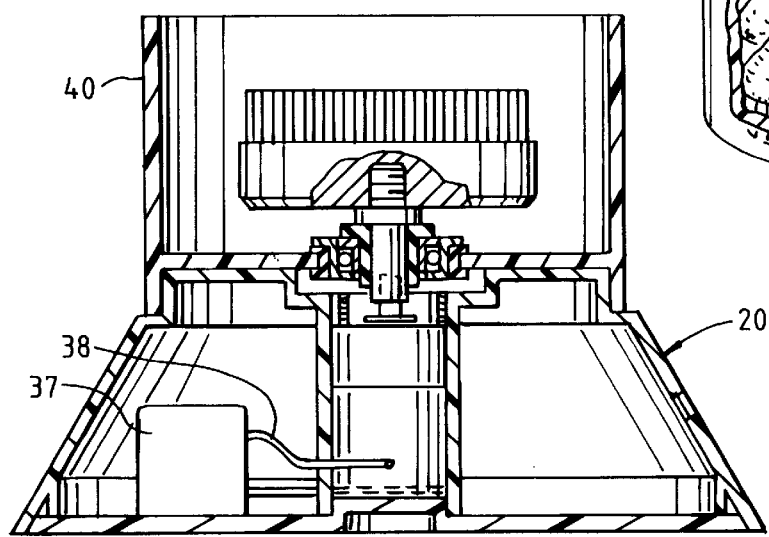

PORTABLE, LOW-PROFILE SCRUBBER DEVICE

BACKGROUND OF THE INVENTION

Pets can be great fun and excellent companions. When pets require cleaning, however, they can be somewhat inconvenient. For example, a dog's or a cat's paws are often the dirtiest and most difficult area of the pet to wash. The paws get the dirtiest because they walk on all sorts of surfaces without protection and often seem to prefer wet, muddy ground. As such, their paws and areas in between their toes become very dirty. These areas are difficult to clean thoroughly. No known device is available to adequately and conveniently clean such areas of a pet or animal. Further, any known devices which have desired rotatable brushes are electrically powered via ac current because of the torque required to power the brushes when making contact with a surface to be cleaned. The present invention provides a powerful, battery-operated motor geared to provide the requisite torque.

The prior art does not disclose a low-profile, battery-operable apparatus for cleaning the paws of an animal. U.S. Pat. No. 4,554,696 to Nye, Jr., discloses an apparatus for washing golf club grips and is expressly incorporated herein by reference. The Nye apparatus utilizes liquid tight bearings similar to those disclosed herein. Nye teaches using an elongated container, not a low-profile container. Nye teaches a device which runs via ac power using an electrical cord. The Nye device is mounted to a surface and does not appear to be portably usable. No prior art discloses the novel invention disclosed and claimed herein.

SUMMARY OF THE INVENTION

The present invention provides a portable, battery operable paw washing device which is low profile and has rotatable scrub brushes immersed in water or other cleaning liquid to clean difficult areas of a dirty pet. The invention preferably comprises a base and an upper housing. The base is generally flat and stable and of a sufficient diameter to resist tipping. Within the base is a battery and a motor. A gear assembly is connected to the shaft of the motor. The gear assembly has a rotor extending through the top of the base for receipt by a sprocket wheel or similar device in the upper housing. The upper housing is also low-profile and is bowl-shaped with an open top to hold water and any other cleaning solutions. The upper housing has a sprocket wheel or similar device and bearing for receiving the rotor from the base in a fluid-tight configuration. One or a plurality of rotatable brushes are operably connected to the sprocket wheel and are of sufficient size to be at least partially submersed in the water in the upper housing.

BRIEF DESCRIPTION OF THE DRAWINGS

FIG. 4 is an exploded, partial cross sectional view of an embodiment of the present invention.

FIG. 5 is a plan view of a power axle of an embodiment of the present invention.

FIG. 6 is a cross-sectional view of an embodiment of the present invention.

FIG. 7 is a transverse cross-sectional view of an embodiment of the sprocket assembly of the present invention utilizing multiple rotating brushes.

FIG. 8 is a perspective, partially broken away view of the embodiment of the invention shown in FIG. 7.

DESCRIPTION OF THE PREFERRED EMBODIMENT

Figure 1:
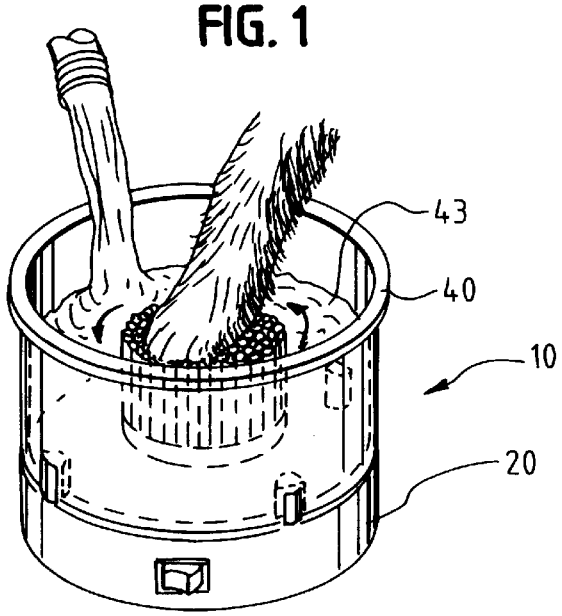
FIG. 1 is a perspective view of an embodiment of the present invention.

Referring now to the drawings and, more particularly, to the preferred embodiment shown in FIGS. 1 through 8, the preferred embodiment is designated generally by reference number 10. The scrubber 10 utilizes a base housing 20 which is cylindrical and low profile. The term "low profile" in this context means of sufficient height to allow a cat or dog, or other animal, to use the scrubber comfortably while keeping its other three paws on the ground. Base 20 is preferably a hard plastic or metal material sufficiently heavy to make the device steady when used. Base 20 may include a rubber covering on the bottom side thereof to resist sliding and tipping when device 10 is in use.

Mounted within base 20 is a motor 30. Motor 30 is preferably an electric motor operable by battery or ac current. The preferred embodiment of the invention operates by battery power. However, if made safely and reliably, the device may be operable by ac power in a fashion which is well known to those of ordinary skill. In fact, in one preferred embodiment, the device includes a rechargeable battery, which battery can include a feature preventing device 10 from operating when the battery is connected to ac current, to ensure maximum safety. A satisfactory motor is product number 32008 made by Johnson Electric NA, 1552 Post Road, Fairfield, Conn. 06430. This motor generates sufficient RPM's at appropriate power levels to perform as desired, and is an appropriate size.

Figure 2:
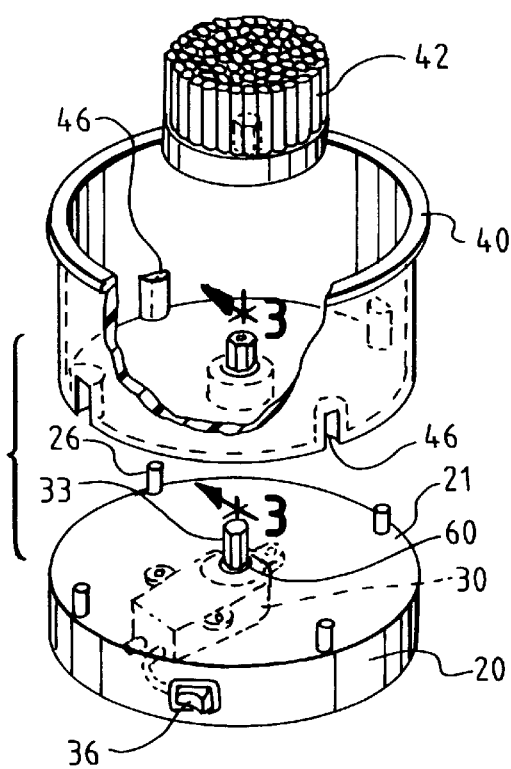
FIG. 2 is an exploded view of an embodiment of the present invention.

The base 20 further has a gear and drive mechanism 60 mounted therein comprised of a pinion type gear train. The gear train is of the type which is well known to those of skill in the art. One suitable gear assembly is the type commonly found in the Black & Decker® Powerdriver electric screwdriver, model no. 9074TB. Used in conjunction with motor 30 as described, the gear assembly 60 will produce twenty inch pounds of torque at 130 RPM's. This is sufficient for operation of the present invention for its intended purposes. Gear assembly 60 is mounted in base 20, together with motor 30 such that rotor 33 extends through the top of base 20. Rotor 33 preferably has a non-circular cross-section, as best seen in FIG. 2. The non-circular cross-section of rotor 33 allows rotor 33 to connect with brush 42 or sprocket assembly in the upper housing 40 without slipping, as described further below.

Also mounted in base 20 is battery pack 37, as best seen in FIG. 6. Battery pack 37 preferably consists of a 2.4V rechargeable NiCad battery unit of two C-sized 1.2V cells in a liquid-tight enclosure. Battery pack 37 has a wire tail 38 with a connector to mate with a corresponding connector from motor 30 or with a corresponding connector on a battery recharger (not shown). A satisfactory battery pack 37 can be supplied by Powersonic, 3106 Spring Street, Redwood City, Calif. 94063, part no. PS-C/2. Battery pack 37 thus can be electrically connected to and disconnected from motor 30 and recharged periodically.

When motor 30 is electrically connected to battery pack 37, motor 30 can be selectively turned on or off with toggle switch 36 mounted on base 20, as seen in FIG. 2. Switch 36 can be virtually any type of well known toggle switches, and it has been found that a simple rocker type or toggle type on/off switch is satisfactory.

Extending upward, in one embodiment, from a top surface 21 of base 20 are a plurality of fingers 26, as seen in FIG. 2. Fingers 26 are arranged circumferentially around base 20. Fingers 26 are shaped and sized to mate with corresponding sockets 46 of upper housing 40, as discussed below. As such, fingers 26 are rigid and able to support housing 40 in a stable fashion.

The present invention further includes an upper housing 40, as mentioned above, and as best seen in FIGS. 1, 2 and 4. Upper housing 40 is a low-profile, generally cylindrically shaped reservoir for containing a cleaning solution 43. Base 20 preferably has a substantially larger diameter than housing 40 to make device 10 very stable when in use, but the diameters may also be the same as shown in FIGS. 1 and 2. Housing 40 is adapted to have an attachment means such as a plurality of sockets 46 arranged circumferentially around the bottom thereof to receive in a snap fit relationship reciprocally arranged fingers 26 arranged circumferentially around base 20. Housing 40 is preferably a sturdy plastic or stainless steel material for rugged use with all types of animals. Housing 40 also has an aperture 47 for receiving a bearing assembly 80 and sprocket assembly 49 in operable association with motor 30, as further explained below.

Figure 3:
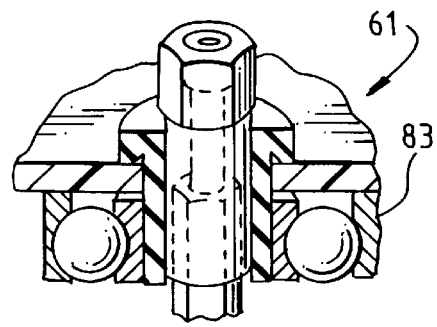
FIG. 3 is a cross-sectional view of an embodiment of the present invention along line 3—3 of FIG. 1.

As best seen with reference to FIGS. 3 and 4, housing 40 includes watertight bearing assembly 80. Assembly 80 includes first rubber bushing 82, ball bearing rotor assembly 83, second rubber bushing 84, and power axle 87. First rubber bushing 82 fits snuggly, coaxially into aperture 47 in the bottom of housing 40. Ball bearing assembly 83 fits snuggly, coaxially into first rubber bushing 82. A satisfactory bearing is made by Stock Drive Products, 2101 Jericho Turnpike, New Hyde Park, N.Y. 11042. This part is a flange style double sealed stainless steel ball bearing packed with grease. Second rubber bushing 84 fits snuggly, coaxially within bearing 83, and power axle 87 fits snuggly, coaxially within rubber bushing 84. Rubber bushings 82, 84 can be supplied by McMaster Carr of Elmhurst, Ill., as part number 9305K23, or similar. Power axle 87 has a lower extension 86, and an upper extension 88, as best seen in FIG. 5. Lower extension 86 has a coaxial indentation 89 for matingly receiving rotor 53 from base 20, in a non-slip configuration. Upper extension 88 of axle 87 preferably has a ¼-28 thread for mating with brush 42 or sprocket assembly 49. Power is therefore transferred from motor 30 through rotor 53, and power axle 87 to brush 42, in a fluid-tight relationship.

Housing 40 has at least one brush 42 rotatably mounted therein which is submersible in solution 43. Brush 42 extends upward from the bottom of housing 40, such that the bristles of brush 42 extend upward. Brush 42 is generally round in cross-section and has bristles 44 extending from a solid portion 48. Solid portion 48 includes a coaxial sleeve 49 and is threaded to receive upper extension 88 of power axle 87. Brush 42 is thereby threadily secured to power axle 87, within housing 40. In one embodiment, bristles 44 extend upwardly and outwardly from solid portion 48 thereof such that a cross-section of the outer surfaces of bristles 49 is substantially cone-shaped, as shown in FIG. 5. The cone shape of bristles 49 allows small areas between the toes of an animal to be scrubbed sufficiently. In another embodiment, as shown in FIGS. 7 and 8, a sprocket assembly 53 includes a plurality of brushes 42 and is attachable to power axle 87.

In operation, when attached to base 20, brush 42 in housing 40 is operably connected to motor 30 via gear structure 60, rotor 33 and power axle 87. On/off switch 36 on the side of base 20 works to activate or deactivate rotation of brushes 42. For normal intended operation, housing 40 would be filled with any liquid cleaning solution 43 and brush 42 would rotate therein. The paws of a dog or other animal which required washing would be immersed in solution 43 and its toes would be cleaned by placing them in contact with the rotating brushes 42. Housing 40 can be removed from engagement with base 20 simply by firmly pulling it away upwardly from base 20. By being separable, housing 40 is separately washable. Further, brush 42 is separable from housing 40 so that brush 40 is independently washable and usable.

Of course, it should be understood that various changes and modifications to the preferred embodiments described herein will be apparent to those skilled in the art. Other changes and modifications, such as those expressed here or others left unexpressed but apparent to those of ordinary skill in the art, can be made without departing from the spirit and scope of the present invention and without diminishing its attendant advantages. It is, therefore, intended that such changes and modifications be covered by the following claims.

What is claimed is:

1. A low-profile, scrubber apparatus comprising:

a portable base carrying at least one battery and a motor powered by the at least one battery;

a portable housing removably mounted to the base having at least one rotatable brush in operative, watertight association with the motor and remaining watertight when removed from the base;

a fluid-tight bearing assembly disposed within said housing, and comprising a first bushing, a bearing coaxially disposed within the first bushing and a second bushing coaxialy disposed within the bearing to receive a shaft; and a gear mechanism connected to the motor to provide sufficient torque to turn the at least one brush when contacting a surface to be scrubbed.

2. The apparatus of claim 1 further comprising mounting means comprising:

a plurality of protrusions circumferentially spaced about the base;

a plurality of sockets circumferentially spaced about a bottom surface of the housing; such that said protrusions are engagable with said sockets in a detachable manner.

3. The apparatus of claim 1 wherein the base is cylindrical.

4. The apparatus of claim 1 wherein the at least one battery is rechargeable.

5. The apparatus of claim 1 wherein the motor is capable of delivering at least about twenty inch pounds of torque at about 130 revolutions per minute.

6. The apparatus of claim 1 wherein the housing is watertight when removed from the base.

7. The apparatus of claim 1 further comprising a bearing assembly disposed within a bottom surface of said housing for connection with said motor.

8. The apparatus of claim 1 further comprising a bearing assembly for connection with said motor and which is removably disposed in said housing.

9. The apparatus of claim 1 wherein the base has a bottom surface and said bottom surface includes a non-slip material.

10. The apparatus of claim 1 wherein the base further comprises a bottom surface having a diameter larger than a top surface thereof and larger than the diameter of the housing.

11. The apparatus of claim 1 further comprising a sprocket within said housing and operably connectable to said motor to allow simultaneous rotation of a plurality of brushes within said housing.

12. The apparatus of claim 1 wherein the at least one brush has bristles facing upward and having ends such that the outer periphery of the ends are substantially cone-shaped.

13. The apparatus of claim 1 wherein the base and the housing are stainless steel.

14. The apparatus of claim 1 wherein the at least one battery is a NiCad type in a fluid-tight enclosure.

15. The apparatus of claim 1 wherein the motor is not actuatable when the at least one rechargeable battery is being recharged.

16. The apparatus of claim 1 wherein the base has a non-circular lateral cross-section and circumferential shoulder and said housing has a circumferential flange which removably mates with and rests on said shoulder to prevent said housing from turning relative to said base.

17. The apparatus of claim 1 wherein the brush is removably disposed within the housing.

* * * * *